United States Patent [19]

Nguyen

[11] Patent Number: 4,782,862

[45] Date of Patent: Nov. 8, 1988

[54] SOLENOID VALVE

[75] Inventor: Hung P. Nguyen, Lockport, N.Y.

[73] Assignee: General Motors Corporation, Detroit, Mich.

[21] Appl. No.: 135,650

[22] Filed: Dec. 21, 1987

[51] Int. Cl.$^4$ .............................................. F16K 31/06
[52] U.S. Cl. ........................... 137/630.14; 251/129.01
[58] Field of Search ...................... 137/630.14, 630.15; 251/129.02

[56] References Cited

U.S. PATENT DOCUMENTS

| 3,011,751 | 12/1961 | Delany | 137/630.14 X |
| 3,797,526 | 3/1974 | Champeon | 137/630.14 |
| 4,251,052 | 2/1981 | Hertfelder | 251/129.02 |

FOREIGN PATENT DOCUMENTS 2317495 10/1973 Fed. Rep. of Germany ........................ 137/630.14

Primary Examiner—Robert G. Nilson
Attorney, Agent, or Firm—R. L. Phillips

[57] ABSTRACT

A solenoid control valve has a main poppet to selectively open and close a port in a passage and when closed is subject to a fluid pressure differential tending to prevent valve opening. To facilitate valve opening, bypass passages through the main poppet are provided for reducing the net pressure on the main poppet and are controlled by a pilot valve. A solenoid and return spring control operation of a tubular plunger with an intregral pilot poppet. The main poppet is carried on a stem which has a telescoping lost motion connection to the plunger thus allowing the poppet to selectively engage a pilot seat on the main poppet for the closed valve state and for separating from the seat during valve opening.

8 Claims, 1 Drawing Sheet

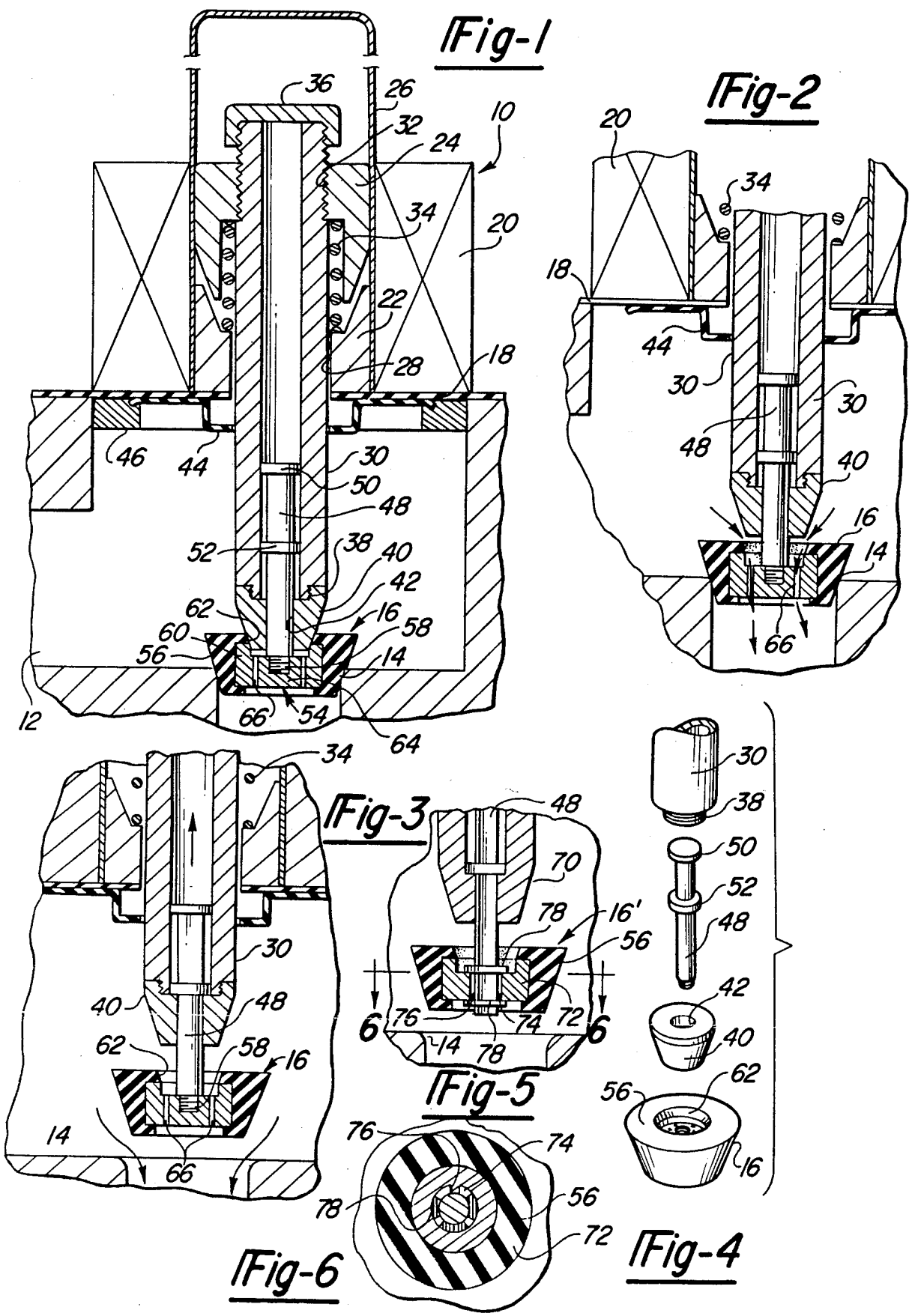

SOLENOID VALVE

FIELD OF THE INVENTION

This invention relates to a solenoid controlled valve and particularly to such a valve having a main valve and a pilot valve to assist the operation of the main valve.

BACKGROUND OF THE INVENTION

It is often desirable to control fluid flow in response to an electrical signal. For example, the circulation of engine coolant to an automobile heater can be controlled by opening or closing a passage connecting the engine coolant system to the heater. The pressures in the coolant system may exceed 50 psi, so that any valve must operate at such pressures.

It has previously been proposed to use a poppet valve for closing the coolant passage under solenoid control and opening the passage under spring force. The coolant pressure would help in holding the valve securely closed. The same pressure would resist the opening of the valve under spring action, so it has been further proposed to provide a pilot valve, smaller in size and less affected by coolant pressure, to control a bypass around the main valve seat to reduce the differential pressure across the main valve sufficiently to allow the valve spring to open the main valve. Unfortunately the pilot valve was also subject valve to pressure holding the valve closed when the coolant pressure was in the higher portion of its normal range and therefore was unreliable in operation.

SUMMARY OF THE INVENTION

It is therefore an object of the invention to provide a pilot assisted solenoid valve operable at high pressures. It is a further object to provide such a valve with a simple design that is easy to manufacture and reliable in operation.

The invention is carried out by a solenoid valve comprising; a solenoid assembly having a coil, a movable armature within the coil for movement in valve-closing direction when the coil is energized and a spring within the coil and coupled to the armature for biasing the armature in valve-opening direction, a tubular plunger fixed to the armature for movement therewith and extending centrally through the solenoid assembly, the plunger terminating in an end portion comprising a pilot valve poppet, a main valve poppet having passage means for fluid flow through the poppet and having a pilot seat surrounding the passage means, means for securing the main valve poppet to the plunger including a stem attached to the main valve poppet and extending into the plunger for limited axial movement therein to permit engagement of the pilot valve poppet with the pilot seat on the main valve, whereby upon coil energization the plunger moves the pilot poppet against the main valve to close the passage means and to urge the main valve in valve-closing direction, and upon coil de-energization the plunger moves first to open the pilot valve and the passage means and then to open the main valve.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a cross-sectional elevation of a valve assembly in valve closed position according to the invention.

FIGS. 2 and 3 are cross-sectional elevations of the valve assembly of FIG. 1 showing the pilot valve open position and the main valve open position, respectively.

FIG. 4 is an exploded isometric view of main and pilot valves according to the invention.

FIG. 5 is a cross-sectional elevation of pilot and main valve details according to a second embodiment of the invention.

FIG. 6 is a cross-sectional view of the main valve taken along line 6—6 of FIG. 5.

DESCRIPTION OF THE PREFERRED EMBODIMENT

Referring to FIGS. 1 through 4, a solenoid valve assembly 10 is positioned in a coolant passage 11 having an inlet branch 12 and outlet port 14. The assembly is positioned opposite and concentrically aligned with port 14 so that a main valve poppet 16 can seat on the port 14. The assembly 10 includes a mounting plate 18 which serves as a closure for one side of the coolant passage 11 and is a support for the operating valve parts. A solenoid coil 20 is mounted on the outer side of the plate 18 and defines a central opening containing a fixed core 22 and a movable armature 24 of ferromagnetic material. A cup-shaped nonmagnetic cover 26 soldered or welded to the core 22 and the plate 18 provides a watertight container for the valve moving parts. The core 22 has a center bore 28 to slidably receive a tubular plunger 30 which is threaded at one end. The armature 24 also has a stepped center bore 32 which is threaded on its smaller diameter for joining to the plunger 30. The larger diameter portion of the bore 32 receives a coil compression spring 34 which surrounds the plunger 30 and bears against the core 22 and armature 24 to bias the armature away from the core to move the valve in the open direction. In FIG. 1 the valve is shown in the closed position due to coil 20 energization and the spring 34 is in a compressed condition.

The upper end of the plunger 30 within the cover 26 is covered by a threaded cap 36. The lower end of the plunger 30 terminates in an externally threaded nipple portion 38 of smaller diameter than the plunger 30 outer diameter. A frusto-conical pilot poppet 40 is threaded onto the nipple portion 38, and contains a central bore 42 of smaller diameter than the inner diameter of the plunger 30. The plunger extends through an aperture in the mounting plate 18 so that the lower end holding the poppet 40 is within the coolant passage. A diaphragm 44 secured to the mounting plate 18 by a retaining ring 46 loosely engages the outer surface of the plunger 30.

The main valve poppet 16 is supported on the plunger 30 by a telescoping lost motion connection comprising a stem 48 which is attached to the poppet 16 and which slidably extends through the bore 42 of the pilot poppet 40 and into the hollow plunger 30. A land 50 or enlarged portion at the top of the stem 48 slides within the plunger bore so that the land 50 and the poppet bore 42 serve as guides to keep the stem 48 in concentric alignment with the plunger 30. A second land or enlarged portion 52 on the stem between the land 50 and the poppet 40 serves as a stop to limit the extent of movement of the main valve poppet 16 relative to the pilot poppet 40.

The valve poppet 16 is comprised of a rigid body 54 covered in part by a rubber or other elastomer material 56. The body 54 is secured to the stem 48 by a threaded connection 58, and has a peripheral rim 60 covered by the rubber material 56 to form a seat 62 for the pilot poppet 40. The seat is spaced from the stem and defines a flow passage when the pilot valve is open. A perforated hub portion 64 of the body 54 within the rim 60 is thinner in the axial direction than the rim 60. The hub contains a plurality of axially extending through apertures 66 providing passageways to bypass the main valve 16. The hub is not covered with rubber so that flow can take place past the pilot seat and through the apertures 66 when the main valve is closed and the pilot valve is open.

An alternative structure shown in FIGS. 5 and 6 uses a one piece plunger and poppet assembly 70 to dispense with the manufacture and assembly of two parts. The main valve poppet 16 has a body 72 with an outer configuration like the body 54 but differs in the arrangement for passages and for attachment to the stem 48. The body 72 has an inner generally cylindrical through aperture 74 but has three longitudinal ribs 76 for concentrically locating the body 72 on the stem 48. Thus the body 72 is effectively spaced from the stem 48 to provide flow passages adjacent the stem 48. The body is secured against axial movement on the stem 48 by a pair of lock washers 78, one on each side of the body 72. A pair of grooves, not shown, in the stem 48 allow the lock washers to be clipped to the stem by lateral insertion.

In operation, the coolant passage is closed by energizing the coil 20 causing the plunger to be thrust toward the port 14. During the plunger movement the pilot valve poppet 40 will engage the seat 62 on the main poppet 16 to close the bypass flow passage through the main valve and will advance the main valve poppet 16 until it seats on the port 14. In the closed condition of the valve, the upstream coolant pressure from the inlet 12 will be imposed on all parts of the valve exposed to the passage 11 and within the cover 26. Notably, downward pressure is exerted on the cap 36 as well as the poppet 16. Thus the forces tending to hold the main poppet 16 in its closed position are the solenoid force and the coolant pressure acting over the entire area of the port 14. On the other hand, there are counter forces tending to lift the poppet 16 comprising the force from the spring 34 and the downstream coolant pressure acting on the bottom of the poppet 16 over the whole area of the port 14. The downstream pressure will generally be somewhat smaller than the upstream pressure so that a substantial net downward force holds the main poppet 16 closed.

To open the main valve the coil 20 is deenergized and the spring 34 urges the plunger 30 upwardly against the pressure on the top of the plunger. The net hydraulic force on the plunger is the differential pressure across the valve acting on the poppet valve area. It is necessary for the spring force to overcome the hydraulic force on the pilot valve to allow the valve to open. The spring force itself should not be made too large because of desirable solenoid size and current limitations. The valve design, however, allows great latitude in the choice of poppet valve area so that a small area and a small valve opening force can be obtained. As indicated in FIG. 2, which shows the valve just after opening of the pilot valve, coolant flow through the passages 66 builds up downstream pressure to reduce the pressure differential across the main poppet 16. As shown in FIG. 3, the plunger 30 pulls up on the stem 48 to attempt to lift the poppet 16. The valve opens when the spring force overcomes the decreasing hydraulic force.

It will thus be seen that the solenoid valve according to the present invention provides a relatively simple configuration with few parts and great design flexibility to achieve reliable operation over a predetermined pressure range.

The embodiments of the invention in which an exclusive property or privilege is claimed are defined as follows:

1. A solenoid valve comprising;
    a solenoid assembly having a coil, a movable armature within the coil for movement in valve-closing direction when the coil is energized and a spring within the coil and coupled to the armature for biasing the armature in valve-opening direction,
    a tubular plunger fixed to the armature for movement therewith and extending centrally through the solenoid assembly, the plunger terminating in an end portion comprising a pilot valve poppet,
    a main valve poppet having passage means for fluid flow through the poppet and having a pilot seat surrounding the passage means,
    means for securing the main valve poppet to the plunger including a stem attached to the main valve poppet, the stem extending into the plunger for limited axial movement therein to permit selective engagement of the pilot valve poppet with the pilot seat on the main valve, whereby upon coil energization the plunger moves the pilot poppet against the main valve to close the passage means and to urge the main valve in valve-closing direction, and upon coil de-energization the plunger moves first to open the pilot valve and the passage means and then to open the main valve.

2. A solenoid valve as defined in claim 1 wherein the main valve poppet comprises a perforated body secured to the stem and an elastomeric cover to provide a sealing surface upon valve closing.

3. A solenoid valve as defined in claim 2 wherein the elastomeric cover extends to a region surrounding and spaced from the stem to define a portion of the passage means and to provide a second sealing surface for engagement with the pilot poppet when the passage is closed.

4. A solenoid valve as defined in claim 1 wherein the main valve poppet has a body with an internally threaded bore and the stem is threadedly attached to the body.

5. A solenoid valve as defined in claim 1 wherein the main valve poppet has a body with a central aperture passing therethrough for receiving the stem and the aperture size being larger than the stem diameter to provide a flow passage around the stem, spacing means in the aperture for centering the body on the stem, and means fastened to the stem for securing the body to the stem.

6. A solenoid valve as defined in claim 1 wherein the plunger comprises a main body terminating in an externally threaded nipple, and the end portion is an internally threaded frusto-conical poppet attached to the nipple.

7. A solenoid valve as defined in claim 1 wherein the plunger is a one-piece assembly comprising a tubular main body terminating in a frusto-conical poppet.

8. A solenoid valve as defined in claim 1 wherein the plunger comprises a main tubular body having a first inner diameter and the end portion has a bore having a smaller inner diameter, and the stem attached to the main valve poppet is small enough in diameter to freely slide in the bore of the end portion, an enlarged end on the stem opposite the main valve for centering the stem within the tubular body, and a stop portion larger than the bore in the end portion for limiting the movement of the stem in the plunger.

* * * * *